United States Patent [19]
Sato et al.

[11] 4,087,627
[45] May 2, 1978

[54] CLOCK REGENERATOR COMPRISING A REVERSIBLE SHIFT REGISTER AND A CONTROLLABLE FREQUENCY DIVIDER

[75] Inventors: Yoshio Sato; Kazuhiro Ikeda, both of Tokyo, Japan

[73] Assignees: Nippon Telegraph & Telephone Public Corporation; Nippon Electric Co., Ltd., both of Tokyo, Japan

[21] Appl. No.: 731,152

[22] Filed: Oct. 12, 1976

[51] Int. Cl.² ............................................. H04L 7/00
[52] U.S. Cl. .................................................. 178/69.1
[58] Field of Search ................... 178/69.1; 179/15 BS; 328/155, 134

[56] References Cited
U.S. PATENT DOCUMENTS

3,828,130  8/1974  Yamaguchi ........................ 178/69.1

*Primary Examiner*—Robert L. Richardson
*Attorney, Agent, or Firm*—Sughrue, Rothwell, Mion, Zinn and Macpeak

[57] ABSTRACT

A clock regenerator for a binary input which comprises a shift register having successively coupled first stages, a single predetermined stage, and second stages. A frequency divider device responsive to a local oscillation and with a controllable ratio produces timing pulses of a timing period equal to that prescribed number of clock periods which may be unity. Each timing pulse presets a binary signal in the single predetermined stage. The signal is shifted, when a transition occurs in binary values of the input signal within a predetermined interval defined by each timing period. The signal is shifted into the first and second stages if the transition occurs during a leading and a trailing half of each timing period, respectively, the timing pulse thus leading and lagging behind the input signal. The shifted binary signal controls the frequency division ratio to phase-synchronize the timing pulses with the input signal.

3 Claims, 5 Drawing Figures

CLOCK REGENERATOR COMPRISING A REVERSIBLE SHIFT REGISTER AND A CONTROLLABLE FREQUENCY DIVIDER

BACKGROUND OF THE INVENTION

This invention is a clock generator for use in a receiver for modulated signals transmitted either by radio or wire.

This invention relates to a clock regenerator or a timing pulse generator for generating, a timing pulse sequence of a timing period that is equal to a prescribed number of clock periods of a digital signal recovered in the receiver from a pertinent one of the modulated signals and phase-synchronized with the clock periods.

In digital wired communication, a transmitter comprises an encoder device responsive to sampling or clock pulses of a clock period for encoding an original or information signal into a digital signal. For transmission through a radio channel, the transmitter further comprises a modulator for modulating a carrier signal by the digital signal to produce a modulated signal to be sent through the channel. Modulated signals are also used in wired communication. A receiver for the modulated signal comprises a demodulator for reproducing or recovering the digital signal from the received modulated signal and a decoder device for decoding the recovered digital signal into a reproduction of the original signal. In order that the decoder device may properly operate, use of clock pulses which are phase-synchronized with the clock pulses used in the participant transmitter is necessary. The digital signal does not explicitly include the clock pulses. A clock regenerator is therefore indispensable in the receiver to regenerate clock pulses from the recovered digital signal and to serve also other purposes, such as shaping and/or retiming of the digital signal to be supplied to the decoder device.

A conventional clock regenerator comprises a voltage controlled oscillator for producing output pulses of a repetition period approximately equal to the clock period of a digital input signal, a phase detector for phase-detecting the input signal with reference to the output pulses to produce a detection output of a voltage dependent on the phase difference between the repetition and clock periods, and a negative feedback loop for controlling the oscillator by the detection output. The regenerator is capable of readily phase-synchronizing the output pulses with the clock periods and of achieving a high effective Q value by adjusting the loop gain to thereby appreciably raise the stability of clock regeneration against noise, jitter, and the like. The oscillator, however, follows the clock period with a considerable delay at the beginning either when the channel of the input modulated signal is switched to another channel or when the modulated signal is supplied to the receiver in bursts.

Another conventional clock regenerator comprises a differentiator for differentiating a digital input signal to produce a unipolar pulse sequence and a band-pass filter of a narrow bandwidth, such as an LC tank circuit tuned to the clock frequency or period, responsive to the pulse sequence for producing the clock pulses. Inasmuch as the amplitude of the produced clock pulses varies with the density of the clock components in the input pulses, it is necessary to use a limiter for suppressing the amplitude fluctuation. When the Q value of the filter is reduced to adapt the regenerator to the input modulated signal supplied to the receiver in bursts, the regenerated clock pulses are unavoidably subject to noise, jitter, and the like.

SUMMARY OF THE INVENTION

It is therefore an object of the present invention to provide a timing pulse generator capable of readily following a digitial input signal which is recovered from an input modulated signal supplied to a receiver even in bursts.

It is another object of this invention to provide a timing pulse generator, which is not adversely affected by noise.

According to this invention, there is provided a timing pulse generator responsive to a local oscillation of a predetermined oscillation period and to a digital input signal of a clock period for generating a sequence of timing pulses of a timing period equal to that prescribed number of clock periods which may be unity. The input signal alternatingly assumes a first and a second state within each clock period in compliance with information being transmitted and with noise pulses which may possibly be superimposed thereon in the meantime. The generator includes a frequency divider for multiplying the oscillation period with a controllable frequency division ratio to produce output pulses, means responsive to the output pulses for producing the timing pulses, a first and a second pulse corresponding to one and the other halves of each timing period, respectively, and control pulses defining predetermined intervals in connection with the respective timing periods, and a shift register having a predetermined stage, at least one first stage for producing a first output signal on one side of the predetermined stage, and at least one second stage for producing a second output signal on the other side of the predetermined stage. The generator further includes means responsive to the timing pulses for setting a first binary signal representative of a preselected one of binary values in the predetermined stage and a second binary signal representative of the other of the binary values in each of the first and second stages. The generator includes a means responsive to the input signal and the control pulses for producing a shift pulse each time the input signal goes from the first state to the second during the predetermined intervals. The generator includes means responsive to each shift pulse and the first and second pulses for shifting the first binary signal in the shift register by one stage towards the first and second stages when the above-mentioned each shift pulse is produced in the above-mentioned one and other halves of each timing period, respectively. The generator also includes means responsive to the timing pulses and the first and second output signals for controlling the frequency division ratio once in each timing period to phase-synchronize the timing pulses to the input signal.

DESCRIPTION OF THE PREFERRED EMBODIMENTS

Figure 1:
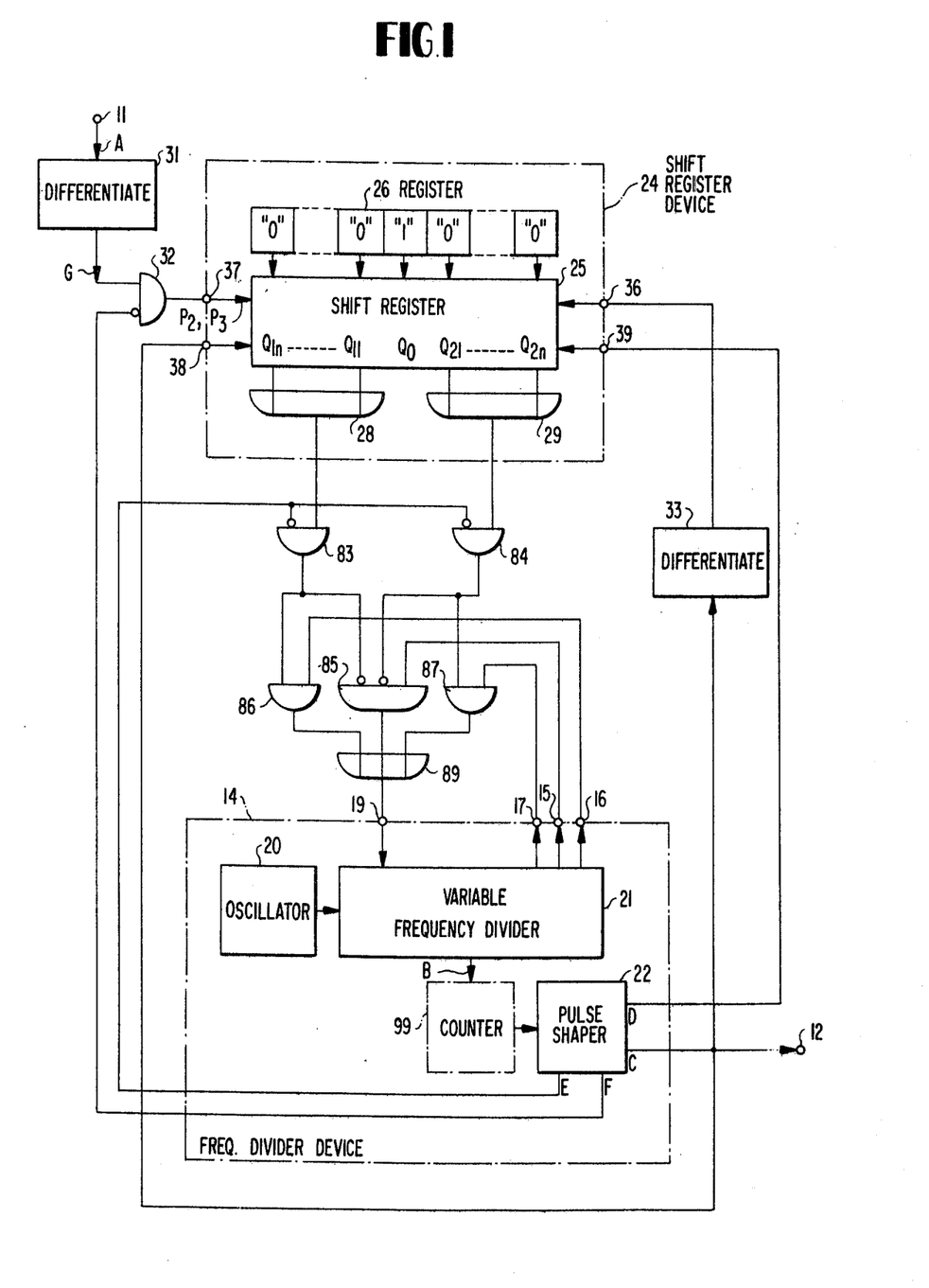
FIG. 1 shows a timing pulse generator according to a first embodiment of the present invention, together with a modification which provides a timing pulse generator according to a second embodiment of this invention.
Figure 2:
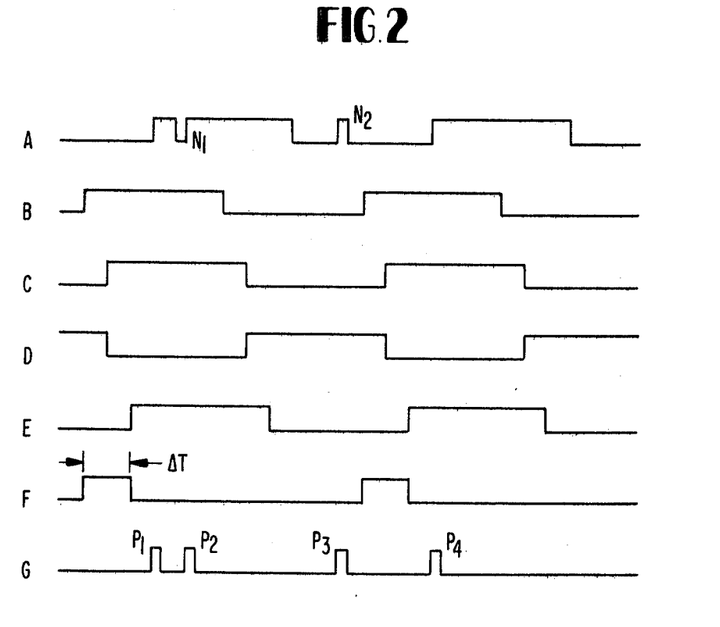
FIG. 2 illustrates signals used in the timing pulse generator according to the first embodiment.

Referring to FIGS. 1 and 2, the timing pulse generator according to the present invention has input and output terminals 11 and 12. When a digital input signal A of a clock period is supplied to the input terminal 11, the generator supplies a sequence of timing pulses of a timing period equal to a prescribed number of clock periods to the output terminal 12. If desired, it is readily possible by choosing unity as the prescribed number to make the generator regenerate clock pulses of the input signal A and thereby serve as a usual clock regenerator. Herein, the input signal A is a binary input signal that alternatingly assumes a first and a second state within each clock period in compliance with the information carried thereby and temporarily in the meanwhile in compliance with noise pulses, such as $N_1$ and $N_2$, which might possibly be superimposed thereon. The first and second states may be either a high or a low level. Throughout the following description, it is assumed merely for brevity that the first state is given by the low level. The depicted portion of the input signal A may be for two consecutive binary "11" values. In this event, a binary "0" value is given by a signal that assumes the second and first states in a former or leading and a latter or trailing half of a clock period.

Further referring to FIGS. 1 and 2, the timing pulse generator also includes a frequency divider device 14 having normal, delaying, and advancing output terminals 15, 16, and 17 for normal, delaying, and advancing pulses and a reset terminal 19 for reset pulses. The divider device 14 has a local oscillator 20 for producing a local oscillation of a stable oscillation frequency or period, a controllable or variable frequency divider 21 and a pulse shaper 22. The variable frequency divider 21 is responsive to the oscillation for producing output pulses B of a duty ratio of substantially 50% with a controllable frequency demultiplication or division ratio. The pulse shaper 22 is responsive to the output pulses B for producing a backward-shift conditioning, or first pulse C; a forward-shift conditioning, or second pulse D, corresponding to one and the other halves of each timing period, respectively, delayed pulses E lagging behind the output pulses B by a preselected phase difference $\Delta T$, and control pulses F defining predetermined intervals in connection with the respective timing periods. The timing pulses may be either of the first and second pulses C and D. In accordance with preferred embodiments of this invention, the frequency division ratio is controllable in the manner later described among normal, delaying, and advancing ratios X, X + x, and X − x. The normal ratio X may be about twenty. The difference x between the normal ratio X and the delaying and advancing ratios is rendered equal to a preselected integer which should naturally be less than the normal ratio X and may be unity. The normal, delaying, and advancing pulses may be of frequencies equal to $1/(X/k)$, $1/(X/k + x)$, and $1/(X/k - x)$ of the oscillation frequency, respectively, where $k$ represents a predetermined integer which may be unity. For a timing pulse generator according to a first embodiment of this invention, it will be understood that unity is selected for the prescribed number of clock periods, that the timing pulses are the first pulses C which correspond to the former or leading halves of the respective timing periods, that the predetermined intervals are given by absence of the control pulses F of the binary "1" value, and that the normal, delaying, and advancing pulses are of frequencies equal to $1/(X/2)$, $1/(X/2 + x)$, and $1/(X/2 - x)$ of the oscillation frequency, respectively. The frequency divider 21 may be a counter that is reset by reset pulses selected, in the manner later described, from the normal, delaying, and advancing pulses. the frequency divider produces only the advancing pulses when the advancing pulses are selected, the advancing and normal pulses when the normal pulses are selected, and all of the normal, delaying, and advancing pulses when the delaying pulses are selected.

Still further referring to FIG. 1, the timing pulse generator has a shift register device 24 comprising, in turn, a reversible shift register 25 having a predetermined stage $Q_0$, a plurality of leading-phase detection or first stages $Q_{11}, \ldots,$ and $Q_{1n}$ on one side of the stage $Q_0$, and a plurality of lagging-phase detection or second stages $Q_{21}, \ldots,$ and $Q_{2n}$ on the other side of the stage $Q_0$. It is unnecessary that the number $n$, which may be about three, are equal for the first and second stages $Q_1$ and $Q_2$ (the second suffixes being omitted). A fixed register 26 has a plurality of stages connected to the respective shift register stages Q (the whole suffixes being omitted). A first binary signal representative of a preselected one of binary values, such as the binary "1" value, is permanently stored in that stage of the fixed register 26 which is connected to the predetermined stage $Q_0$. A second binary signal representative of the other binary value, namely, the binary "0" value in the depicted example, is also permanently stored in each of the remaining fixed register stages. Leading-phase detection or first and lagging-phase detection or second OR gates 28 and 29 are provided to derive logic sums of first and second output signals produced, in the manner later described, by the first and second stages $Q_1$ and $Q_2$, respectively. As the case may be, negative logics should be substituted for the OR gates 28 and 29.

Referring again to FIGS. 1 and 2, the shift register device 24 is accompanied by a control circuit therefor comprising an input differentiator 31 for differentiating the input signal A to produce a sequence of input pulses G, as indicated at $P_1$, $P_2$, $P_3$, and $P_4$, whenever the input signal A is subjected to a transition in its binary values or, more particularly, goes from a preselected one of the first and second states to the other, for example, from the first state to the second. Inhibited by the control pulses F, an input NAND gate 32 allows passage therethrough of only those of the input pulses G which are produced within the predetermined intervals and which serve as shift pulses. A control differentiator 33 differentiates preselected ones of the first and second pulses C and D to produce a set pulse at the beginning of each timing period. Responsive to each set pulse supplied to a set terminal 36, the binary signals stored in the fixed register 26 are simultaneously supplied to the respective shift register stages Q to be preset therein. Responsive to each shift pulse supplied to a shift terminal 37, the binary signals preliminarily set in the shift register stages Q are simultaneously shifted by one stage backwardly and forwardly towards into the first and second stages $Q_1$ and $Q_2$ when the first and second pulses C and D are supplied to backward and forward shift conditioning terminals 38 and 39, respectively. When the binary signals preset in the end stages $Q_{1n}$ and $Q_{2n}$ are thus shifted to the inwardly adjacent stages, the end stage $Q_{1n}$ or $Q_{2n}$ is automatically loaded with another binary signal of the above-mentioned other binary value.

In the operation of the shift register device 24 and the control circuit therefor, the predetermined intervals are selected so that those of the input pulses G which are produced by the normal transitions in the input signal binary values, as $P_1$ and $P_4$, may not become the shift pulses when the timing pulses C are phase-synchronized with the input signal A and that only those of the input pulses G which are produced by the noise pulses, as $P_2$ and $P_3$ by $N_1$ and $N_2$, may become the shift pulses under the circumstances. When the phase synchronization or synchronism is not yet achieved or goes out of order, the shift pulses are also produced by the normal transitions. In this connection, it should be pointed out that the number $n$ of the first or second stages $Q_1$ or $Q_2$ is made greater than the number of noise pulses which might appear in each half timing period, as $N_1$ or $N_2$, and that the noise pulses are generally uniformly distributed in each timing period so as to shift the binary "1" signal preset in the predetermined stage $Q_0$ to a certain one of the first stages $Q_1$ during the presence of each first pulse C and back towards the predetermined stage $Q_0$ during the presence of the next following second pulse D. At the end of this second pulse D, a new set signal again presets or resets the binary "1" signal in the predetermined stage $Q_0$ even though the binary "1" signal previously preset may be present at this instant in the first or second stages $Q_1$ or $Q_2$. When the timing pulses C lead the input signal A as illustrated in FIG. 2, a shift pulse appears in compliance with each normal transition, as $P_1$ or $P_4$, during the presence of each first pulse C. The shift pulses produced in each timing period, as $P_1$, $P_2$, and $P_3$, shift the binary "1" signal into the first stages $Q_1$ and thereafter towards the second stages $Q_2$ and leave the same in the first one of the first stages $Q_{11}$ at the substantial end of the timing period. As a result, the first OR gate 28 produces a detected leading-phase signal of the binary "1" value while the second OR gate 29 produces no output signal of the binary "1" value. When the timing pulses C lag behind the input signal A, the second OR gate 29 produces a detected lagging-phase signal of the binary "1" value while the first OR gate 28 produces no binary "1" output signal.

Figure 3:
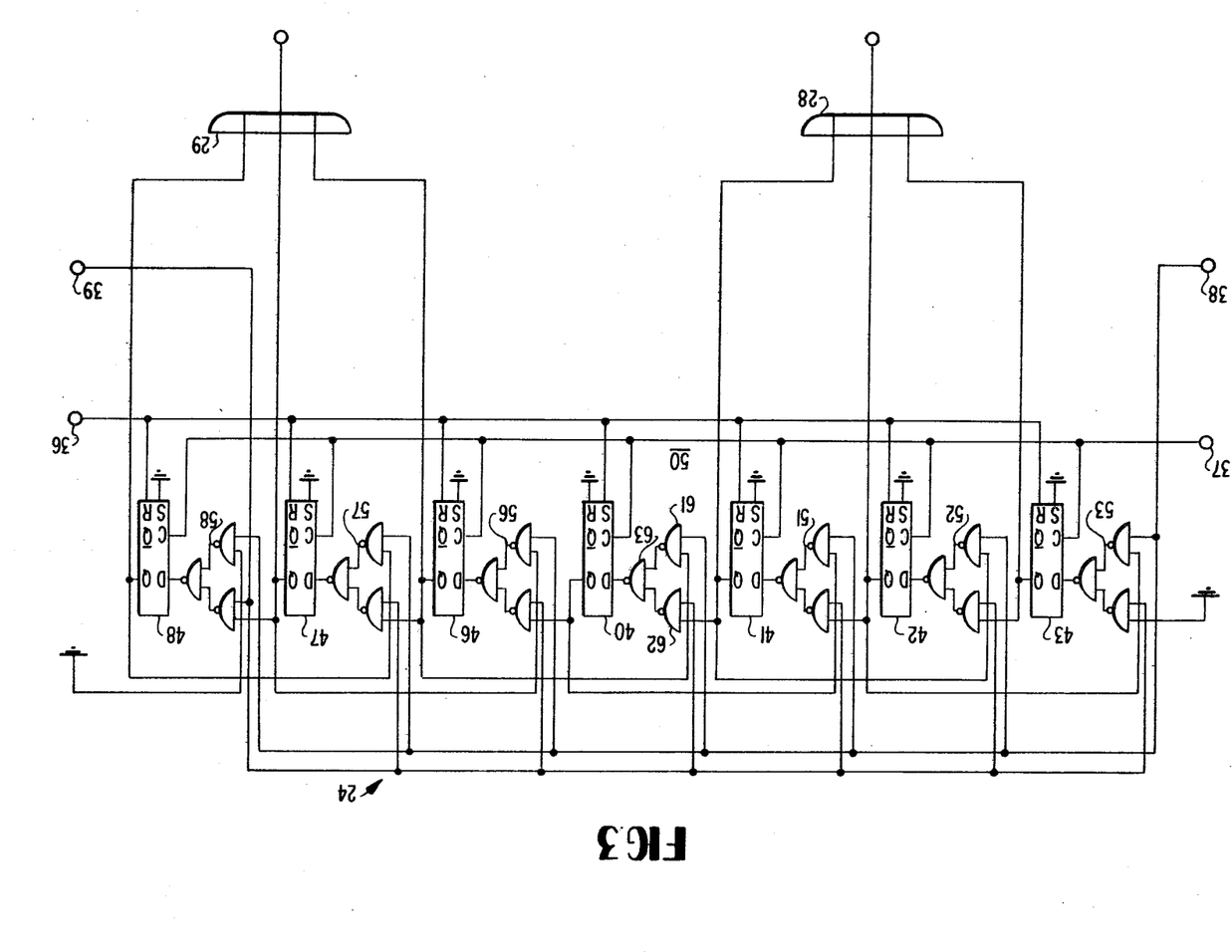
FIG. 3 is a block diagram of an example of a shift register device for use in a timing pulse generator according to this invention.

In FIG. 3, the shift register device 24 may comprise a shift register comprising, in turn, a predetermined flip-flop 4Q, three first flip-flops 41, 42, and 43, three second flip-flops 46, 47, and 48, and seven input AND-OR logic circuits 50, 51, 52, 53, 56, 57, and 58 connecting the flip-flops 40, 41-43, and 46-48 as shown. Each flip-flop is of the known edge-triggered D type and has C, D, R, S, Q, and $\overline{Q}$ terminals. The set pulses are supplied from the set terminal 36 to the S terminal of the predetermined flip-flop 40 and to the R terminals of the first and second flip-flops 41-43 and 46-48. The R terminal of the predetermined flip-flop 40 and the S terminals of the other flip-flops 41-43 and 46-48 are grounded. The shift pulses, such as $P_2$ and $P_3$, are supplied from the shift terminal 37 to the C terminals of the flip-flops 40, 41-43, and 46-48. The Q terminals of the first and second flip-flops 41-43 and 46-48 are connected to the first and second OR gates 28 and 29, respectively. Each set pulse thus presets or resets a binary "1" signal in the predetermined flip-flop 40 and binary "0" signals in the other flip-flops 41-43 and 46-48 without the use of the fixed register 26 (FIG. 1). The input logic circuit 50 for the predetermined flip-flop 40 comprises a backward NAND gate 61 having a first input connected to the Q terminal of the next succeeding flip-flop 46 and a second input connected to the backward shift conditioning terminal 38, a forward NAND gate 62 having a first input connected to the Q terminal of the next preceding flip-flop 41 and a second input connected to the forward shift conditioning terminal 39, and a single NAND gate 63 for supplying the output of the forward or backward NAND gate 61 or 62 to the D terminal of the predetermined flip-flop 40. Other input logic circuits 51-53 and 56-58 are similar in structure to the above-detailed input logic circuit 50 except that the first backward NAND gate input for the most succeeding flip-flop 48 and the first forward NAND gate input for the most preceding flip-flop 43 are grounded to automatically supply a binary "0" signal to a relevant one of these flip-flops 43 and 48 when the binary "0" signal preset in the flip-flop 43 or 48 is shifted to the inwardly adjacent flip-flop 42 or 47.

Figure 4:
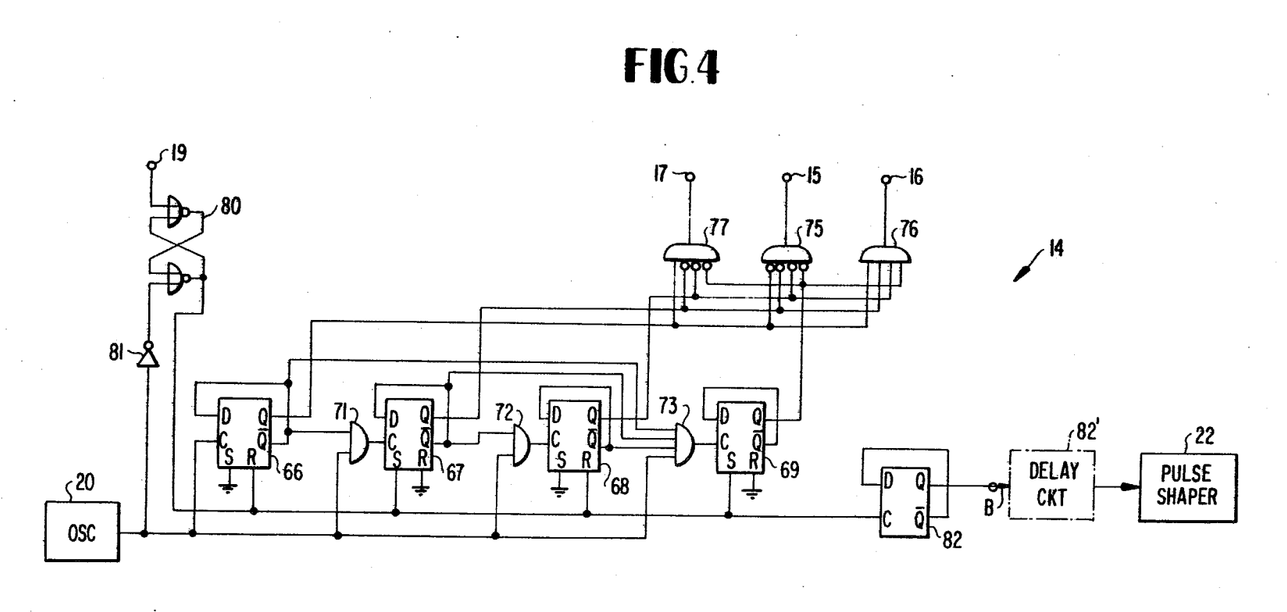
FIG. 4 shows an example of a frequency divider for use in a timing pulse generator according to this invention, together with a modification of the exemplified divider to illustrate modifications of the first and second embodiments.

In FIG. 4, the controllable frequency divider 21 includes four counter flip-flops 66, 67, 68, and 69 and three interstage AND gates 71, 72, and 73 connected in the manner illustrated as a down counter. Each counter flip-flop is of the known edge-triggered D type and has C, D, R, S, Q, and $\overline{Q}$ terminals. The counter further comprises normal, delaying, and advancing logic circuits 75, 76, and 77 responsive to the Q output signals of the flip-flops 66-69 for supplying in the manner presently described the normal, delaying, and advancing pulses to the normal, delaying, and advancing output terminals 15-17, respectively. The S, R, S, and R terminals of the respective flip-flops 66-69 are grounded. Each reset pulse supplied from the reset terminal 19 to the R, S, R, and S terminals of the respective flip-flops 66-69 through an input flip-flop 80 resets the counter flip-flop 66-69 to a reset state where the count of "1010" is put in the counter. For this example of the frequency divider 21, the local oscillation consists of oscillation pulses. The input flip-flop 80 is supplied with the oscillation pulses through an inverter 81. The counter down-counts the oscillation pulses supplied thereto, or oscillation periods, to produce the normal, delaying, and advancing pulses each time the count reaches "0000," "1111," and "0001," when the counter is supplied with ten, eleven, and nine oscillation pulses, respectively, before the counter is reset. The counter may further comprise an auxiliary counter for producing each output pulse B in response to the reset pulses, the predetermined integer k in number. The auxiliary counter may be an additional flip-flop 82 having C, D, Q, and $\overline{Q}$ terminals connected as shown to produce each output pulse B at the additional flip-flop Q terminal in response to two reset pulses successively supplied to the additional flip-flop C terminal through the input flip-flop 80. When the input pulse is produced at the beginning of each clock period, as $P_1$ or $P_4$, each reset pulse should be produced at the substantial end of the timing period that comprises the clock period. If not, a delay circuit 82' may be placed after the auxiliary counter or somewhere else so as to make the output pulses B build up immediately following every predetermined number of the reset pulses supplied to the reset terminal 19.

Referring back to FIGS. 1 and 2, the frequency divider device 14 if accompanied by a control circuit. The control circuit includes a leading-phase detection or first and a lagging-phase detection or second NAND gates 83 and 84. When an input pulse is produced each time the input signal A goes from the first state to the second, as described hereinabove and exemplified at $P_1$ or $P_4$, each of the NAND gates 83 and 84 is inhibited and enabled by the former or leading and the latter or trailing halves of each delayed pulse E, respectively. The NAND gates 83 and 84 produce no output pulse of the binary "1" value in the former halves and allows the detected leading-phase and lagging-phase signals, if any, to pass therethrough only in the latter halves to produce detected leading-phase and lagging-phase pulses. When produced in the absence of the detected leading-phase and lagging-phase pulses or in the former halves even in the presence of the detected pulses, the normal pulses pass through a normal gate 85 to serve as the reset pulses. When produced even in the latter halves, the normal pulses pass through the normal gate 85 in the absence of the detected pulses to serve also as the reset pulses. The delaying and advancing pulses pass through delaying and advancing gates 86 and 87 only when the detected leading-phase and lagging-phase pulses are supplied thereto in each latter half to serve as the reset pulses, respectively. In any event, the reset pulses thus produced are supplied to the reset terminal 19 through an OR gate 89.

In operation, it may be presumed merely for clarity of description that the frequency divider 21 comprises the down counter accompanied by the additional flip-flop 82 as described hereinabove and that the control circuit for the divider device 14 comprises the gates 83–87 as described in conjunction with the first embodiment. The down counter is reset in the former halves of the respective delayed pulses E regardless of the phase synchronism, each time ten oscillation pulses are counted, and in each latter half, when ten, eleven, or nine oscillation pulses are counted according as which of the normal, delaying, and advancing pulses is used as the reset pulse. Consequently, the additional flip-flop 82 renders the frequency of the output pulses B equal to 1/20, 1/21, and 1/19 of the oscillation frequency according as the timing pulses C are in phase synchronism with, lead, and lag behind the input signal A, respectively. The frequency divider 21 thus divides the oscillation frequency by $X - x$, if the phase-synchronism is not yet achieved or goes into disorder in such a manner that the timing pulses C lag behind the input signal A, to advance the phase of the timing pulses C until not only the advancing pulses but also the normal pulses are produced in the latter timing period halves. If the timing pulses C lead the input signal A, the frequency divider 21 divides the oscillation frequency by $X + x$ to delay the phase of the timing pulses B until no more delaying pulses but only the normal and advancing pulses are produced. It is thus possible to correct phase a synchronism, if any, of the timing pulses C with reference to the input signal A.

Figure 5:
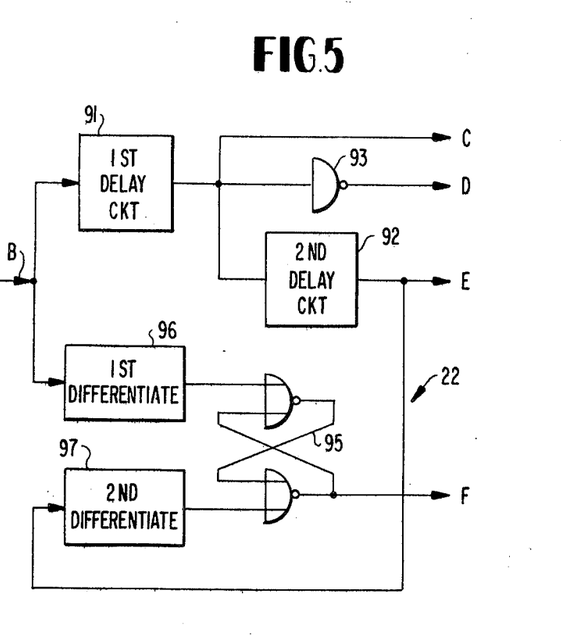
FIG. 5 is a block diagram of an example of a pulse shaper for use in a timing pulse generator according to this invention.

Referring finally to FIG. 5, the pulse shaper 22 may comprise a first delay circuit 91 for delaying the output pulses B by about a half of the preselected phase difference $\Delta T$ to produce the first or timing pulses C, a second delay circuit 92 for further delaying the timing pulses C to produce the delayed pulses E, and an inverter 93 for inverting the timing pulses C to produce the second pulses D. Each delay circuit 91 or 92 may be a resistor and a capacitor (not shown) connected in the known manner. A flip-flop 95 is responsive to the differentiated outputs of first and second differentiators 96 and 97 for the output and delayed pulses B and E to produce the control pulses F.

With the first embodiment thus far described, it may be that the binary "1" signal preset in the predetermined stage $Q_0$ is shifted beyond the end one of the first stages $Q_{1n}$ when the number of noise pulses, such as $N_1$, produced in each half timing period is greater than the number $n$ of the first stages $Q_1$. For such a noisy channel, a greater number $n$ should be resorted to although a least possible number $n$ is preferred in order to prevent the phase asynchronism from being over corrected by the noise pulses. The preselected phase difference $\Delta T$ should be decided in consideration of the desired speed of phase correction and may be about 1/30 of the timing period. The local oscillator 20 is not an essential element of a timing pulse generator according to this invention except that use is necessary of a local oscillation which may be generated elsewhere in the receiver with a predetermined oscillation frequency. As described in connection with the first and second OR gates 28 and 29, the logic circuits 83–87 and others should be suited to the polarities of the pulses supplied thereto.

For a timing pulse generator according to a second embodiment of this invention, the prescribed number of clock periods is rendered equal, for example, to five as described in general above and illustrated in FIGS. 1 and 2 of the drawings. For this purpose, an additional counter 99 (FIG. 1) may be interposed between the frequency divider 21 and the pulse shaper 22 to produce an output pulse B each time the frequency divider 21 produces five frequency-divided output pulses. Inasmuch as the shift register, such as 25, is preset or repeatedly reset by each set pulse produced every five clock periods, use is preferred of the firt shift register stages $Q_1$, about five times as many in number as the above-exemplified number $n$ of three. It is possible in this case to supply the first and second output signals of only the fifth ones of the respective stages $Q_{15}$ and $Q_{25}$ (not shown) directly to the normal and delaying gates 85 and 86 and to the normal and advancing gates 85 and 87, respectively. With this arrangement, the phase synchronism is achieved with a somewhat slow speed but regardless of the noise pulses. If the speed is important, use should be made of the first and second OR gates 28 and 29, each for a small number of the first or second stages $Q_1$ or $Q_2$ adjacent to the fifth stage $Q_{15}$ or $Q_{25}$. It will be understood in this connection that only those stages, such as the fifth ones $Q_{15}$ and $Q_{25}$ exemplified above, of the shift register which make contribution to control of the frequency division ratio may be regarded as the first and second shift register stages.

For confirmation, the above-mentioned other logic circuits suited to the pulse polarities include the normal, delaying, and advancing logic circuits 75–77 which may be appropriately supplied with the $\overline{Q}$ output signal or signals of the counter flip-flops 66–69. The reset pulses produced in response to the normal, delaying, and advancing pulses may be called normal, delaying, and advancing reset pulses. As suggested in Brief Description of the Drawing, the delay circuit 82' illustrated with reference to FIG. 4 may be placed between the frequency divider 21 and the pulse shaper 22 in FIG. 1 according to the first embodiment and either prior to or subsequent to the additional counter or frequency divider 99 according to the second embodiment.

What is claimed is:

1. A clock pulse generator for generating a clock pulse having a repetition frequency substantially equal to the bit rate of an incoming digital signal and being in phase-synchronization therewith, said generator comprising:
- an input means for receiving said digital signal;
- a frequency-stabilized oscillator having a predetermined oscillation frequency substantially equal to an integral multiple of said bit rate;
- a variable frequency divider responsive to a control signal for frequency dividing the output of said oscillator at a rate depending on said control signal;
- means coupled to said input means and said frequency divider for comparing the phase of the output of said frequency divider with that of said digital signal;
- means responsive to said phase comparing means for producing said control signal to effect the change in said rate of frequency dividing so that the decreased and increased rates may result in the phase-retarding and phase-advancing in the output of said frequency divider with respect to said digital signal, thereby to establish said phase-synchronization between said digital signal and said output of said variable frequency divider; and
- output means for extracting the output of said frequency divider as said clock pulse.

2. A clock pulse generator as claimed in claim 1, wherein said phase comparison means includes a reversible shift register having a first and a second group of binary stages and a mid-point binary stage, said first and second groups being arranged to provide an output binary signal respectively when said output of said frequency divider leads and lags behind said digital signal in phase.

3. A clock pulse generator as claimed in claim 1, wherein said frequency divider comprises a pulse counter and wherein said control signal producing means comprises a logic circuit responsive to the output of said reversible shift register for providing a reset pulse for said counter to cause the resetting of said counter thereby to change the rate of said frequency dividing.

* * * * *

UNITED STATES PATENT AND TRADEMARK OFFICE
CERTIFICATE OF CORRECTION

PATENT NO. : 4,087,627
DATED : May 2, 1978
INVENTOR(S) : Yoshio SATO and Kazuhiro IKEDA It is certified that error appears in the above-identified patent and that said Letters Patent are hereby corrected as shown below:

IN THE ABSTRACT:

Line 1 - after "signal" insert -- which --

Column 5, line 51 - delete "4Q" insert -- 40 --

Column 6, line 47 - after "0001," insert -- namely, -- line 67 - after "14" delete "if" insert -- is --

Signed and Sealed this

Tenth Day of October 1978

[SEAL]

Attest:

RUTH C. MASON
*Attesting Officer*

DONALD W. BANNER
*Commissioner of Patents and Trademarks*